United States Patent
Trieb

(10) Patent No.: US 7,562,767 B2
(45) Date of Patent: Jul. 21, 2009

(54) CONVEYING INSTALLATION FOR TRANSPORTING GOODS BY WAY OF A CONVEYOR BELT

(75) Inventor: Herbert Trieb, Lochau (AT)

(73) Assignee: Innova Patent GmbH, Wolfurt (AT)

( * ) Notice: Subject to any disclaimer, the term of this patent is extended or adjusted under 35 U.S.C. 154(b) by 21 days.

(21) Appl. No.: 11/961,271

(22) Filed: Dec. 20, 2007

(65) Prior Publication Data
US 2009/0057106 A1   Mar. 5, 2009

(30) Foreign Application Priority Data
Aug. 27, 2007   (AT)  .............................. A 1343/2007

(51) Int. Cl.
*B65G 39/20* (2006.01)
(52) U.S. Cl. ...................... 198/845; 198/817
(58) Field of Classification Search ................ 198/321, 198/817, 818, 845, 860.1, 828, 838
See application file for complete search history.

(56) References Cited

U.S. PATENT DOCUMENTS 3,844,404 A * 10/1974 Emmenegger .............. 198/828
4,166,528 A * 9/1979 Renner ........................ 198/825
6,588,583 B2 * 7/2003 Trieb ........................... 198/845
6,863,174 B1 * 3/2005 Trieb ........................... 198/845
6,935,490 B2   8/2005 Trieb

FOREIGN PATENT DOCUMENTS

EP            1 452 466 A1    9/2004

* cited by examiner

*Primary Examiner*—James R Bidwell
(74) *Attorney, Agent, or Firm*—Laurence A. Greenberg; Werner H. Stemer; Ralph E. Locher

(57) ABSTRACT

A conveying installation for transporting goods has a conveyor belt that is guided over deflecting drums at the two ends of the installation and which is formed with a pair of first supporting cables that are borne by supports that are strategically placed in the installation and on which there are fastened supports for a pair of second supporting cables and for a pair of third supporting cables. The conveyor belt has supporting bars with supporting rollers mounted at each end. The supporting rollers of the forward strand of the conveyor belt roll along the second supporting cables and the supporting rollers of the return strand roll along the third supporting cables. There are provided first supporting frames, which bear the second supporting cables such that they run along catenary curves between the supports, and second supporting frames, which bear the third supporting cables such that they run more or less rectilinearly over the course of the installation.

5 Claims, 4 Drawing Sheets

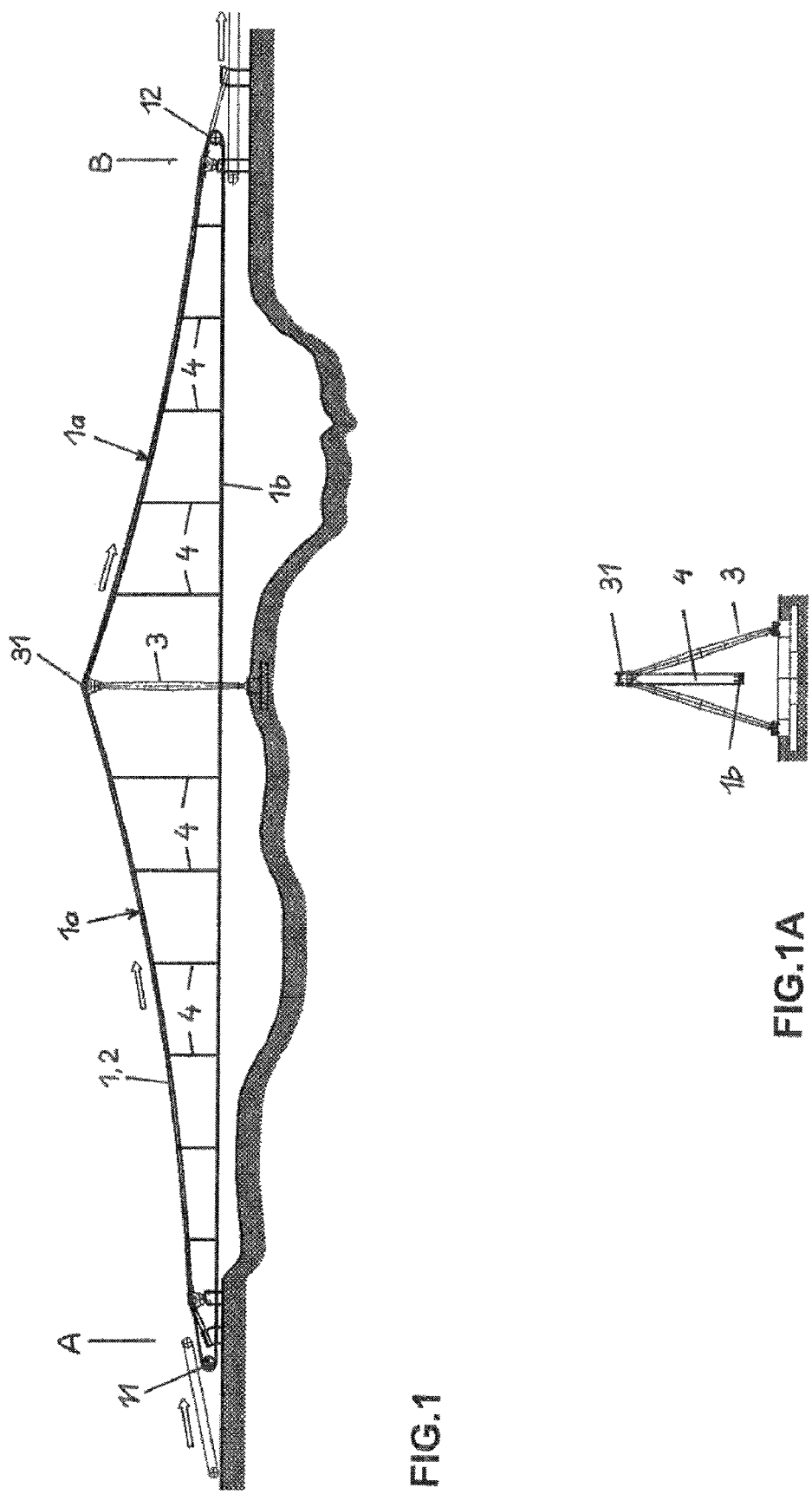

CONVEYING INSTALLATION FOR TRANSPORTING GOODS BY WAY OF A CONVEYOR BELT

CROSS-REFERENCE TO RELATED APPLICATION

This application claims the priority, under 35 U.S.C. § 119, of Austrian patent application A 1343/2007, filed Aug. 27, 2007; the prior application is herewith incorporated by reference in its entirety.

BACKGROUND OF THE INVENTION

Field of the Invention

The present invention relates to a conveying installation for transporting goods by means of a conveyor belt which is guided over deflecting drums at the two ends of the installation and which is formed with a pair of first supporting cables which are borne by supports provided in the installation and on which are fastened supporting means for a pair of second supporting cables and for a pair of third supporting cables. The conveyor belt is configured with crossbars that carry running rollers mounted at each of their ends. Furthermore, the running rollers of the load-bearing, forward strand of the conveyor belt roll along the second supporting cables and the running rollers of the non-loaded, return strand of the conveyor belt roll along the third supporting cables.

Such a conveying installation is known, for example, from the commonly assigned U.S. Pat. No. 6,935,490 B2 and its European counter-part EP 1452466 A1. That conveying installation has a pair of first supporting cables which are borne by supports and on which are fastened supporting frames, which bear a pair of second supporting cables and a pair of third supporting cables. The conveyor belt here is designed with supporting bars which are oriented transversely to the movement direction of the conveyor belt and has supporting rollers located at each of their ends, it being the case that the supporting rollers of the loaded, forward strand of the conveyor belt roll along the second supporting cables and the supporting rollers of the non-loaded, return strand of the conveyor belt roll along the third supporting cables.

Such conveying installations, which may be long in length, have supports for bearing the pair of first supporting cables over the course of the installation. Between these supports, all the supporting cables and the conveyor belt run along catenary curves. Since the conveyor belt here is subjected to very high loading as it runs over the supports, it is necessary for it to be guided over supporting rollers in the regions of the supports. Since this loading occurs both in the case of the loaded, forward strand of the conveyor belt and in the case of the non-loaded, return strand of the conveyor belt, both strands of the conveyor belt thus have to be guided over supporting rollers in the region of the supports. In order for it also to be possible to support the return strand of the conveyor belt, the conveyor belt has to be turned in the upward direction downstream of the unloading station. However, this means that a respective turning means has to be provided in the conveying installation downstream of the unloading station and upstream of the loading station, this giving rise to additional design outlay and also, during operation of the conveying installation, to additional maintenance outlay.

SUMMARY OF THE INVENTION

It is accordingly an object of the invention to provide a conveying installation for transporting goods by way of a conveyor belt which overcomes the above-mentioned disadvantages of the heretofore-known devices and methods of this general type and which provides for a conveying installation in which the return strand need not be supported by supporting rollers, in which case there is no need for any turning means With the foregoing and other objects in view there is provided, in accordance with the invention, a conveying installation for transporting goods, comprising:

an endless conveyor belt guided about deflecting drums at terminal ends of the installation and extending along a forward strand and a return strand;

one or more supports and a pair of first supporting cables borne by the supports;

supporting means fastened to the first supporting cables for carrying a pair of second supporting cables and a pair of third supporting cables;

the conveyor belt including supporting bars with supporting rollers mounted at each end thereof, the supporting rollers of the forward strand of the conveyor belt rolling along the second supporting cables and the supporting rollers of the return strand of the conveyor belt rolling along the third supporting cables;

the supporting means including first supporting frames carrying the second supporting cables running along catenary curves between the supports, and second supporting frames carrying the third supporting cables running substantially rectilinearly over a course of the installation.

In other words, the objects of the invention are achieved by the provision of first supporting frames, which bear the second supporting cables such that they likewise run along catenary curves between the supports, and by the provision of second supporting frames, which bear the third supporting cables such that they run more or less rectilinearly over the course of the installation.

Since the second supporting cables likewise run along catenary curves, they can likewise perform supporting functions. Since, in contrast, the third supporting cables run more or less rectilinearly, they perform predominantly guiding functions for the non-loaded, return strand of the conveyor belt. Since the return strand runs more or less rectilinearly as a result, there is no need for it to be guided over supporting rollers. For this reason, furthermore, there is no need for the conveyor belt to be turned in the upward direction downstream of the unloading station, in which case there is no need for any turning means.

The first supporting frames, which are fastened directly on the first supporting cables, are preferably at least more or less of the same height, as a result of which the height profile of the second supporting cables along the installation is more or less equal to the profile of the first supporting cables. Furthermore, preferably the second supporting frames are at least more or less of the same height, and they are fastened on the first supporting frames by means of supporting elements, these supporting elements being of different lengths over the course of the installation, in which case the third supporting cables run more or less rectilinearly over the course of the installation. As an alternative, the second supporting frames are likewise fastened on the first supporting cables.

According to a further-preferred embodiment, the first supporting cables are formed by a plurality of parallel supporting cables. Furthermore, it is also possible for the second supporting cables to be formed by a plurality of supporting cables arranged at least more or less horizontally one beside the other, the supporting rollers provided on the supporting bars being offset axially in relation to one another such that the supporting rollers of a first supporting bar roll along first supporting cables of the second pair of supporting cables and the supporting rollers of a following supporting bar roll along second supporting cables of the second pair of supporting cables.

Other features which are considered as characteristic for the invention are set forth in the appended claims.

Although the invention is illustrated and described herein as embodied in conveying installation for transporting goods by means of a conveyor belt, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF DRAWING

FIG. 1 shows a side view of a conveying installation according to the invention;

FIG. 1A shows a detail of the conveying installation according to FIG. 1, as seen in the longitudinal direction of the installation;

DETAILED DESCRIPTION OF THE INVENTION

Figure 2A:
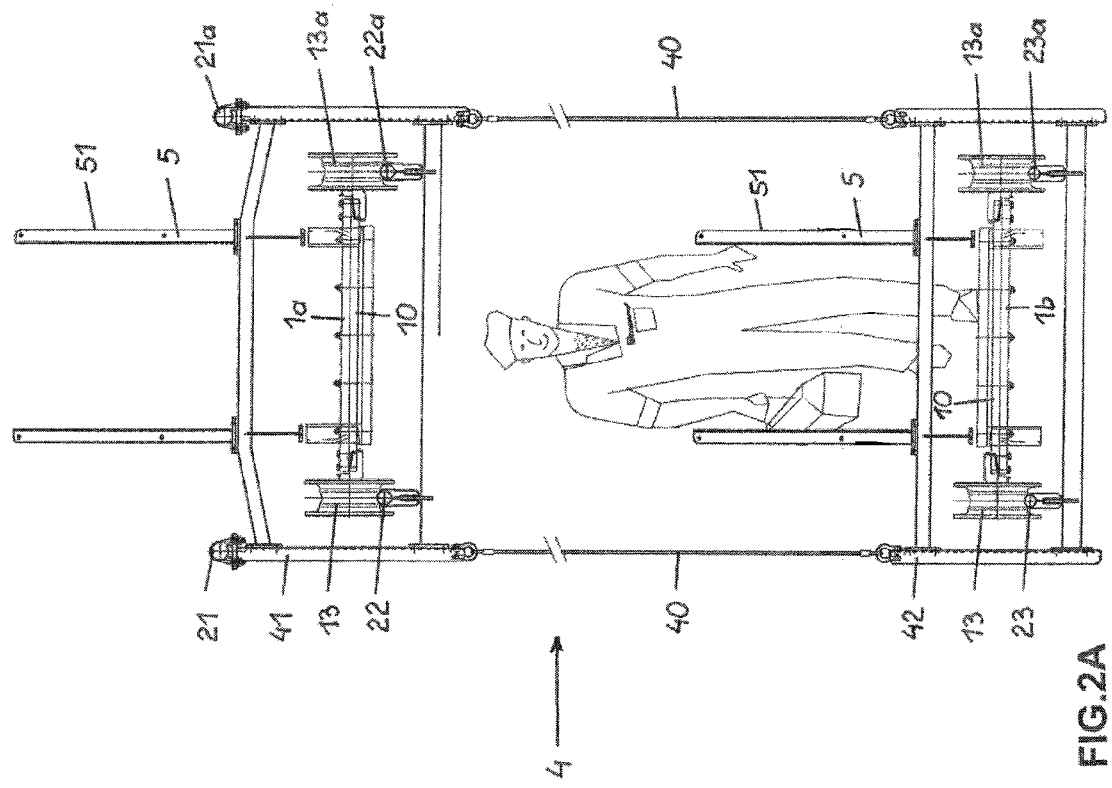
FIG. 2A is a view in a longitudinal direction of the installation.

Referring now to the figures of the drawing in detail and first, particularly, to FIG. 1 and FIG. 1A thereof, there is shown a schematic of a conveying installation which transports goods from a loading station A to an unloading station B. Provided for this purpose is a continuous conveyor belt 1 which is moved, along at least one pair of first supporting cables 2, from the loading station A to the unloading station B and back from the latter to the loading station A. The forward strand 1a of the conveyor belt 1 here is guided, over the course of the conveying installation, over supporting rollers 31 located on at least one support 3. Furthermore, deflecting drums 11 and 12, over which the conveyor belt 1 moves, are located in the loading station A and in the unloading station B. The at least one pair of supporting cables 2 and the forward strand 1a of the conveyor belt 1 here run along catenary curves.

In the case of known conveying installations of this type, both the forward strand of the conveyor belt and the return strand of the conveyor belt are guided over at least one support. Since, in the case of prior art conveying installations of this type, the conveyor belt is designed with upwardly open chambers for accommodating the goods, while it has a planar surface only on its underside, it is necessary, in the case of such conveying installations, to provide downstream of the unloading station, in which the conveyor belt is guided over a deflecting drum, as a result of which the conveying chambers are open in the downward direction, a turning means, which turns the conveyor belt in the upward direction in order for it to be possible for the conveyor belt to be guided by means of its bottom surface over the supporting rollers provided on the at least one support. Furthermore, it is then likewise necessary to provide a turning means, for turning the conveyor belt again, upstream of the unloading station, whereupon the conveyor belt is guided over a deflecting drum located in the loading station and can thus be loaded in the loading station.

In order for it to be possible, in contrast, for the conveying installation according to the application to dispense with turning means in the unloading station and in the loading station, the return strand 1b of the conveyor belt of the conveying installation according to the invention, rather than being guided over the at least one support 3, is fastened on the at least one pair of first supporting cables 2 by way of differing-length supporting means 4 such that it runs more or less rectilinearly between the unloading station B and the loading station A.

Figure 2:
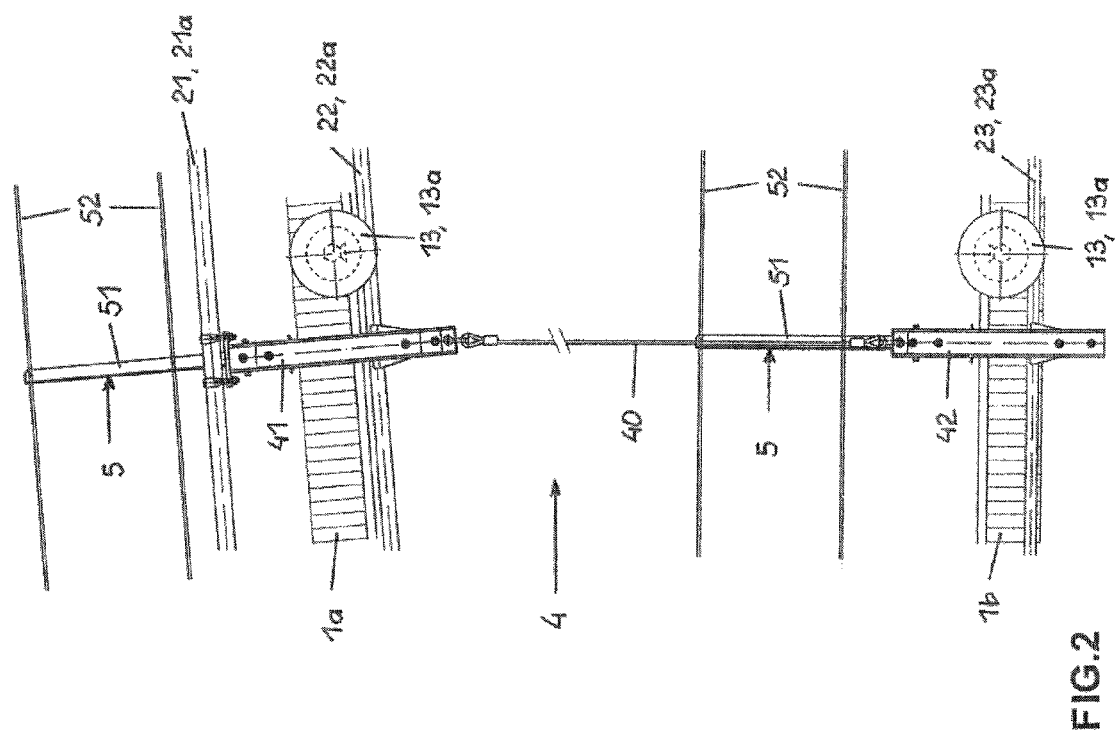
FIG. 2 is a side view of a portion of the conveying installation according to FIG. 1, on an enlarged scale in relation to FIG. 1.

As can be seen from FIGS. 2 and 2A, the conveying installation contains the pair of first supporting cables 21 and 21a, on which are fastened the supporting means 4 for the two strands 1a and 1b of the conveyor belt 1. The supporting means 4 comprise first supporting frames 41, which are fastened on the first supporting cables 21 and 21a and on which are fastened pairs of second supporting cables 22 and 22a, via which the forward strand 1a of the conveyor belt 1 is moved. Provided for this purpose on the conveyor belt 1 are spaced-apart carrying bars 10, on which are mounted supporting rollers 13 and 13a which, in the case of the forward strand 1a of the conveyor belt 1, roll over the two supporting cables 22 and 22a.

Furthermore, second supporting frames 42 are fastened in each case on the first supporting frames 41 by means of supporting elements 40, such as chains or cables, and these second supporting frames bear a pair of third supporting cables 23 and 23a, along which the supporting rollers 13 and 13a of the return strand 1b of the conveyor belt 1 roll.

The supporting cables 21 and 21a and the supporting cables 22 and 22a run along catenary curves over the longitudinal extent of the conveying installation. Since the spaced-apart supporting elements 40 provided over the longitudinal extent of the conveying installation are of different vertical lengths, the supporting cables 23 and 23a, in contrast, run more or less rectilinearly between the unloading station B and the loading station A, as a result of which the movement of the return strand 1b of the conveyor belt 1 does not undergo any deflection, at which points the conveyor belt would have to be guided over supporting rollers.

It should be pointed out, in addition, that, in order to safeguard maintenance staff, the supporting frames 41 and 42 are designed with railings 5, which comprise posts 51 and bracing cables 52.

Figure 3:
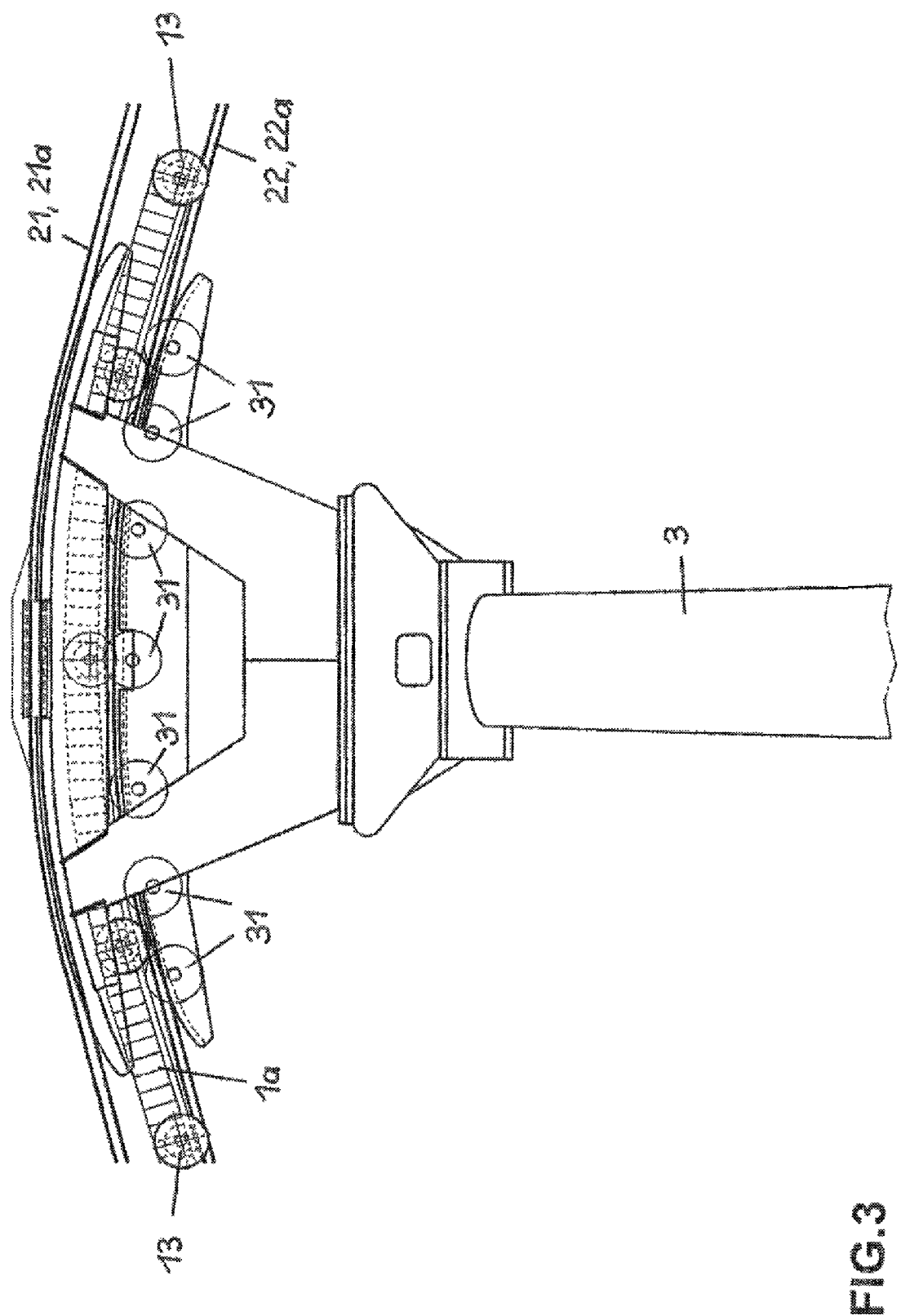
FIG. 3 is a side view of a further detail of the conveying installation according to FIG. 1.

FIG. 3 shows that the first supporting cables 21 and 21a and also the second supporting cables 22 and 22a are borne by supports 3, and that also mounted on the supports 3 are supporting rollers 31, via which the forward strand 1a of the conveyor belt 1 is guided, and thus supported, in the region of the supports 3.

Figure 4:
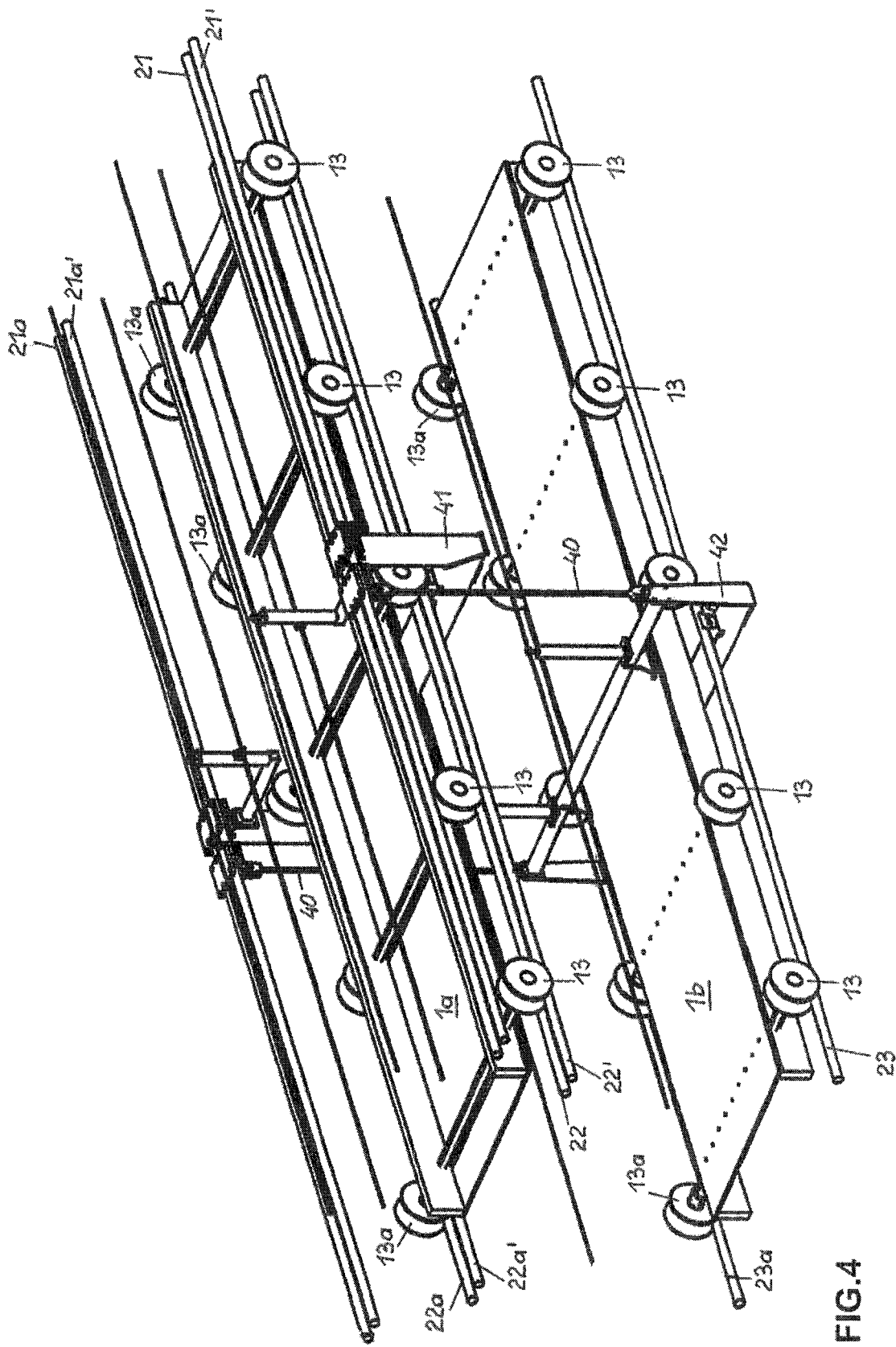
FIG. 4 is an axonometric illustration of a variant of the conveying installation according to FIG. 1.

FIG. 4 will be used herein below to explain a variant of the conveying installation according to FIGS. 2 and 2A.

In this case of this embodiment, the first supporting cables are formed by, in each case two supporting cables 21, 21' and 21a, 21a', on which the supporting frames 41 are fastened. Furthermore, the second pair of supporting cables, borne by the supporting frames 41, are likewise formed by in each case two supporting cables 22, 22' and 22a, 22a', which are located horizontally one beside the other. In addition, successive supporting rollers 13 and 13a of the conveyor belt 1 are offset axially in relation to one another such that first supporting rollers 13, 13a roll in each case along the supporting cables 22 and 22a and second supporting rollers 13, 13a roll in each case along the supporting cables 22' and 22a'. Furthermore, the supporting frames 42 located beneath are likewise fastened on the in each case two pairs of first supporting cables 21, 21' and 21a, 21a' by means of supporting cables 40. These supporting frames 42, however, bear only two individual supporting cables 23 and 23a, over which in each case second supporting rollers 13 and 13a roll. Since the return strand 1b of the conveyor belt 1 is not loaded, it is inconsequential if it is only every second supporting roller 13 and 13a which is guided over an associated supporting cable 23 and 23a.

Since the return strand 1b of the conveyor belt 1 is not loaded, the third supporting cables 23 and 23a need to perform only a slight supporting function, as a result of which they can run more or less rectilinearly. It is thus also the case that the return strand 1b of the conveyor belt 1 runs more or less rectilinearly, for which reason there is no need for it to be guided over supporting rollers. This means that there is no need to turn the conveyor belt 1 in the unloading station, for which reason there is no need to provide any turning means in the unloading station and in the loading station. The design of such a conveying installation is substantially simplified as a result.

The invention claimed is:

1. A conveying installation for transporting goods, comprising:
   an endless conveyor belt guided about deflecting drums at terminal ends of the installation and extending along a forward strand and a return strand;
   one or more supports and a pair of first supporting cables borne by said supports;
   supporting means fastened to said first supporting cables for carrying a pair of second supporting cables and a pair of third supporting cables;
   said conveyor belt including supporting bars with supporting rollers mounted at each end thereof, said supporting rollers of said forward strand of said conveyor belt rolling along said second supporting cables and said supporting rollers of said return strand of said conveyor belt rolling along said third supporting cables;
   said supporting means including first supporting frames carrying said second supporting cables running along catenary curves between said supports, and second supporting frames carrying said third supporting cables running substantially rectilinearly over a course of the installation.

2. The conveying installation according to claim 1, wherein said first supporting frames are fastened directly on said first supporting cables and have a substantially uniform height, such that a height profile of said second supporting cables along the installation is substantially equal to a height profile of said pair of first supporting cables over the course of the installation.

3. The conveying installation according to claim 1, wherein said second supporting frames have a substantially uniform height, said second supporting frames are fastened on said first supporting frames or on said first supporting cables by way of coupling elements, and wherein said coupling elements have mutually different lengths over the course of the installation, such that said third supporting cables run substantially rectilinearly over the course of the installation.

4. The conveying installation according to claim 1, wherein said first supporting cables are a plurality of mutually parallel supporting cables.

5. The conveying installation according to claim 1, wherein said second supporting cables are a plurality of supporting cables disposed substantially horizontally one beside the other, said supporting rollers are provided on successive supporting bars being offset axially in relation to one another such that said supporting rollers of a first said supporting bar roll along a first supporting cable of said second supporting cables and said supporting rollers of a following said supporting bar roll along a horizontally adjacent, second supporting cable of said second supporting cables.

\* \* \* \* \*